United States Patent [19]

Bailey

[11] Patent Number: 5,972,220
[45] Date of Patent: Oct. 26, 1999

[54] PRE-THICKENED AEROBIC DIGESTER SYSTEM

[75] Inventor: Elena Bailey, Austin, Tex.

[73] Assignee: Enviroquip, Inc., Austin, Tex.

[21] Appl. No.: 09/089,886

[22] Filed: Jun. 3, 1998

[51] Int. Cl.[6] ................................................ C02F 11/02
[52] U.S. Cl. ........................ 210/605; 210/613; 210/614; 210/625; 210/903
[58] Field of Search .................................. 210/605, 609, 210/613, 614, 623, 625, 630, 703

[56] References Cited

U.S. PATENT DOCUMENTS

| | | | |
|---|---|---|---|
| 4,029,575 | 6/1977 | Bykowski et al. | 210/605 |
| 4,183,808 | 1/1980 | Drnevich | 210/625 |
| 5,182,021 | 1/1993 | Spector | 210/625 |
| 5,288,405 | 2/1994 | Lamb, III | 210/625 |
| 5,342,523 | 8/1994 | Kuwashima | 210/605 |
| 5,871,009 | 9/1998 | Kos | 210/605 |

OTHER PUBLICATIONS

Daigger, G.T., "Operational Modification of a Conventional Aerobic Digester . . . ", Oct. 1997, pp. 1–11.
Shoemaker, Sellers, "Use What You Have," Nov. 1997, pp. 15–18.
Ponugoti, Dahab, Surampalli, "Effects of different biosolids treatment . . . ", Nov./Dec. 1997, pp. 1195–1206.

Primary Examiner—Christopher Upton
Attorney, Agent, or Firm—Thomas M. Freiburger

[57] ABSTRACT

An aerobic treatment process is operated to reduce overall oxygen requirements, to maintain general pH balance and to produce a low-coliform solids effluent. From the system's clarifier a slurry of concentrated solids is moved to a premix basin, where the slurry is vigorously aerated for a sufficient time to raise microbial activity and dissolved oxygen content. The aerated, microbially active sludge is then moved to a gravity thickener basin, in which solids are allowed to settle to the bottom without aeration, to establish a quiescent state in the settled sludge and also an anoxic stage. This causes the sludge to be denitrified by microbial action, raising and stabilizing the pH of the sludge. Separated supernatant liquid is decanted and removed from the gravity thickener. The sludge is moved into an aerobic digester, where the sludge is aerated and nitrification occurs but using less aeration than normally required in a digester, due to the effect of anoxic/aerobic phases. A portion of the slurry in the aerobic digester basin is recycled back to the premix basin. Another important aspect is the use of two digesters, only one in loop with the premix and thickener at any one time, with each digester being taken out of the loop and isolated when a solids content of about 25,000 to 35,000 mg/L (2½% to 3.5%) is achieved in that digester. The isolation results in a significantly lowered coliform content in the effluent sludge.

23 Claims, 2 Drawing Sheets

PRE-THICKENED AEROBIC DIGESTER SYSTEM

BACKGROUND OF THE INVENTION

This invention is concerned with sewage treatment involving aerobic digesters, and specifically the invention relates to a method of operating an activated sludge process in such a way as to minimize capital requirements, minimize aeration requirements and minimize coliform count in solids effluent.

In sewage treatment plants, aerobic digestion as a means of stabilizing sludge has been common practice for decades. During the process of digestion, nitrification of the sludge tends to occur when sufficient air is provided, normally via submerged aeration bubblers. However, if nitrification is allowed to continue unchecked, this will lead to a pH drop in the system. A low pH (e.g. about 5) will retard microbial activity, and efficiency of the process will be lost. To recover this lost alkalinity, plant operators have in the past added alkaline agents, specifically lime, to the digester. Also, it is known that on the liquid side of the system, e.g. in aeration basins upstream of clarifiers, aeration air may be shut off for a period of time to enable denitrification of the sludge to occur. This can be used to recover up to about 50% of the lost alkalinity. The abrupt shutoff of air to the microbes, which have become very active during aeration, causes the microbes to break down nitrates in the sludge, utilizing the oxygen from the nitrates and releasing nitrogen gas. Acidity in the solution is reduced in this way, and on the liquid side it has been common to cycle the air on and off to maintain pH in a desired range.

It has also been suggested to incorporate an anoxic operating period into the aerobic digestion cycle. See, for example:

Matzuda, A., T. Ide, and S. Fujii (1988), "Behavior of nitrogen and phosphorus during batch aerobic digestion of waste activated sludge—continuous aeration and intermittent aeration by control of DO," *Water Res.*, vol. 22, 1495–1501;

Peddie, C. C., D. S. Mavinic, and C. J. Jenkins (1990), "Use of ORP for Monitoring and Control of Aerobic Sludge Digestion," *Journal of Environmental Engineering*, vol. 116, 461–471;

Hao, O. J. and M. H. Kim (1990), "Continuous Pre-Anoxic and Aerobic Digestion of Waste Activated Sludge," *Journal of Environmental Engineering*, vol. 116, 863–879; and Hao, O. J., M. H. Kim, and I. A. Al-Ghusain (1991), "Alternating aerobic and anoxic digestion of waste activated sludge," *Journal of Chemical Technology and Biotechnology*, vol. 52, 457–472. As pointed out in that literature, aerobic/anoxic operation has the advantages of recovering lost alkalinity and it can reduce overall oxygen requirements in the aerobic digestion process.

A recent paper by Glen T. Daigger presented at the 70th Annual Conference & Exposition of the Water Environment Federation in Chicago, Ill. in October 1997 reviews aerobic/anoxic operation as an improvement to conventional aerobic digestion processes. As reviewed in that paper, one problem in operating conventional aerobic digestion systems is the depletion of alkalinity during aeration, caused by nitrification of released ammonia-nitrogen, which results in a decrease in pH, reducing biological reaction rates. Daigger points out that in the absence of nitrification, the overall digester reaction is as follows:

$$C_5H_7O_2N + 5\ O_2 \rightarrow 4\ CO_2 + NH_4HCO_3 \qquad (1)$$

where $C_5H_7O_2N$ represents the typical composition of biomass. Alkalinity is produced in the form of ammonium bicarbonate, which at neutral pH will ionize to produce ammonium ions and bicarbonate ions.

With nitrification which tends to occur in the aerobic digester, the ammonia-nitrogen is converted to nitrate-nitrogen:

$$NH_4^+ + 2\ O_2 \rightarrow NO_3^- + 2\ H^+ + H_2O \qquad (2)$$

Thus, two moles of acidity are produced, because one mole of ammonia is consumed and one mole of nitric acid is produced. Thus, the overall reaction (combining the two above equations) becomes:

$$C_5H_7O_2N + 7\ O_2 \rightarrow 5\ CO_2 + 3\ H_2O + HNO_3 \qquad (3)$$

This shows that process oxygen requirements are increased with the occurrence of nitrification, as indicated by an increase from five moles of oxygen per mole of biomass to seven moles of oxygen per mole of biomass, comparing the first and third equations above. The acidity produced by the nitric acid will consume some of the alkalinity produced in the first equation.

As further explained by Daigger, if an anoxic phase is included in the aerobic digestion cycle, the reaction is as follows:

$$C_5H_7O_2N + 4\ NO_3^{31} + H_2O \rightarrow NH_4^+ + 5\ HCO_3^- + 2\ N_2 \qquad (4)$$

No free oxygen is consumed during this reaction, and alkalinity is produced, which can then be used in nitrifying the ammonia-nitrogen released from the biomass destruction. If the aerobic and anoxic periods can be controlled such that all of the nitrate-nitrogen formed during the aerobic phase is reduced in the anoxic phase, then the overall reaction becomes:

$$C_5H_7O_2N + 5.75\ O_2 \rightarrow 5\ CO_2 + 2\ N_2 + 4\ H_2O \qquad (5)$$

Equations (3) and (5) above demonstrate that the aerobic/anoxic stages introduced in aerobic digestion systems can reduce process oxygen requirements. As pointed out in the Daigger paper (the source of the above equations), equations (3) and (5) show reduction from seven moles of $O_2$ per mole of biomass to 5.75 moles of $O_2$ per mole of biomass, a 17% reduction. Moreover, alkalinity is not consumed in the overall reaction. Alkalinity from the destruction of biomass (equation (1)) and resulting from denitrification is that required to provide the alkalinity needed for nitrification (equation (2)). Thus, the pH of the digester, if a controlled aerobic/anoxic process is maintained, should remain near neutral.

The Daigger paper, and tests supporting the paper, suggested establishing the anoxic stage in the digester itself, by cycling aeration on and off (e.g. off for 6 to 8 hours each day).

Prior conventional practice in activated sludge digestion was to draw settled sludge from a main activated sludge process or from clarifier basin(s) and deliver this sludge directly to the digester(s), although it has been common to recycle some of the solids from the clarifier to the aeration basin to maintain a desired solids content in the aeration basin. In more recent years aerobic digester systems have been modified to bring a thicker sludge to the digester, in order to meet requirements for longer retention times without increasing tank volumes. Gravity thickeners, belt thickeners, drum thickeners, centrifuges and even recycle loops have been used, with the purpose of reducing tankage capital costs to achieve target retention times. Enviroquip's prior art Pre-thickened Aerobic Digestion (PAD) system is an example of such a system which pre-thickens sludge prior to aerobic digestion, reducing capital costs in tankage requirements. That system incorporates a premix/thickener/digester recycle loop to progressively thicken wasted sludge.

Thicker sludges delivered to the digester have created several problems, including problems of oxygen transfer, mixing and mechanical equipment. Moreover, pre-thickened systems have not been operated in a manner to achieve the benefits of the invention described herein; nor have aerobic/anoxic cycling been applied in the efficient way which forms a part of the process of the invention.

The recent enactment of stricter EPA sludge quality laws, and regulations defining compliance with sludge standards such as Class A sludge or Class B sludge, have driven efforts to improve the aerobic digestion process.

It is among the objects of this invention to improve the aerobic digestion process with a system which reduces tankage capital costs, maintains pH balance without addition of alkaline agents, reduces overall aeration requirements by as much as 17%, and enables consistent compliance with Class B sludge regulations.

SUMMARY OF THE INVENTION

According to the invention, an activated sludge process with prethickened aerobic digestion is operated in such a way as to assure consistent, reliable compliance with Class B sludge requirements while minimizing capital costs and reducing aeration requirements. The process involves sludges thickened preferably to about 2½ to 3½% and detention times of 20 to 40 days, instead of the typical holding of sludge for a minimum of 60 days at 15° C. The new process requires use of specific equipment operated in a particular manner as described herein.

In the process of the invention, a traditional gravity thickener must be used for prethickening of the sludge, rather than a centrifuge, rotary drum thickener or belt thickener. The reason for this requirement is that the gravity thickener in this process is designed to serve also to provide an anoxic zone which forces denitrification to take place automatically in the thickener without having to cycle aeration on and off. The gravity thickener in effect is used as an in-line denitrification or anoxic zone. In theory the sludge in a recycle loop can be denitrified to the extent that all nitrogen is released as nitrogen gas, as in equation (5) above. The gravity thickener is properly designed, sized and operated to provide a proper detention time to assure denitrification, but not to allow an anaerobic environment to develop.

Detention time in the thickener can be varied by varying the recycle rate. The process parameters must be such as to enable recycling capability from the digesters to the gravity thickener without creating short circuiting, to enable thickening of sludge up to about 3½% solids or until constrained by excessive heat generation. Volume of the gravity thickener as compared to the digester, as well as the rate of recycle, are important design and operating parameters for achieving the correct flow rate of denitrified sludge into the digester so that pH is controlled and aeration requirements can be minimized. It is believed that the anoxic zone should have a volume which is about 25% of the total volume of the digester and thickener combined. This will normally provide a system which can be fine tuned by adjustment of detention times and recycle rate.

With the anoxic zone properly sized and operated, oxygen requirements in the digestion process, through completion, are significantly reduced because as nitrates are converted to nitrogen, carbon dioxide and water, oxygen is released for use in digestion, contributing up to 17% of aerobic digestion oxygen requirements.

In accordance with the process a digester isolation phase is included, and that phase ends only when at least 38% volatile solids reduction has been achieved overall, or a standard uptake rate of less than 1.5 mg $O_2$/hr/gm T.S.S.; and pathogen reduction below 2,000,000 colony forming units has been achieved.

In a preferred embodiment of the process of the invention, incoming sludge is fed to a premix basin from a main activated sludge process or from clarifiers. Some activated sludge systems lack clarifiers but utilize a main activated sludge process from which a sludge is wasted to digesters. Such a sludge may or may not consist of settled solids as from a clarifier, but in either event the sludge can be treated by the process of the invention. In the premix basin this sludge is mixed with recycle sludge from the in-loop digester basin. Preferably a vigorous aeration is used, and this brings up the dissolved oxygen level of the sludge, preferably to at least about 2.0 mg/L, although detention time in the premix basin will typically be short. The primary reason for premix is to thoroughly mix the newly incoming sludge with the recycled sludge.

Requirements of this unique process include the gravity thickener, strictly controlled recycle within each premix/thickener/digester loop, control of temperature in the digester to remain between 20° C. and 35° C., maintenance of pH between 6.8 and 8.0, and operation of the digesters and premix basin at nearly constant basin water levels when in loop. The process can be monitored manually or in an automated fashion, as to ammonia level and nitrate level (the latter indicated by acidity), to determine desired detention times in the aerobic and anoxic stages. Monitoring can be performed in each of the premix, thickener and digester basins, at least until performance becomes predictable. Timers can be set to control these detention times.

The process of the invention is designed to include at least two digester basins, one of which is in loop while the other is isolated, but the system can utilize three, four or more digester basins if desired, for example, in the case where nearly continuous decanting of sludge throughout the cycle is required in order to feed a belt press or a regular sludge removal program. The system may be designed to accept continuous flow, while still maintaining the out-of-loop digester sludge in isolation to ensure pathogen reduction below 2,000,000 colony forming units. In preferred embodiments the system is operated so that while one basin is in loop the other is held fully in isolation or is decanting. This prevents contamination of sludge before discharge, while ensuring that new sludge can continue to be fed to the other in-loop basin.

In a preferred embodiment of the process, the digesters and preferably the premix area are covered in order to insulate the sludge temperature from the ambient temperature and the outside elements, thus enabling more stable operation of the process regardless of season. Temperature, in particular, affects efficiency of the digestion process.

Accordingly, principal objects of the invention are to consistently produce Class B sludge using aerobic digesters, with less than 40-day detention time, using thicker sludges, thereby greatly reducing operating and capital (tankage) costs, while also avoiding the use of alkaline agents to balance pH, and in addition, reducing overall aeration requirements, further saving operating costs. These and other objects, advantages and features of the invention will be apparent from the following description of a preferred embodiment, considered along with the accompanying drawings.

DESCRIPTION OF PREFERRED EMBODIMENTS

Figure 1:
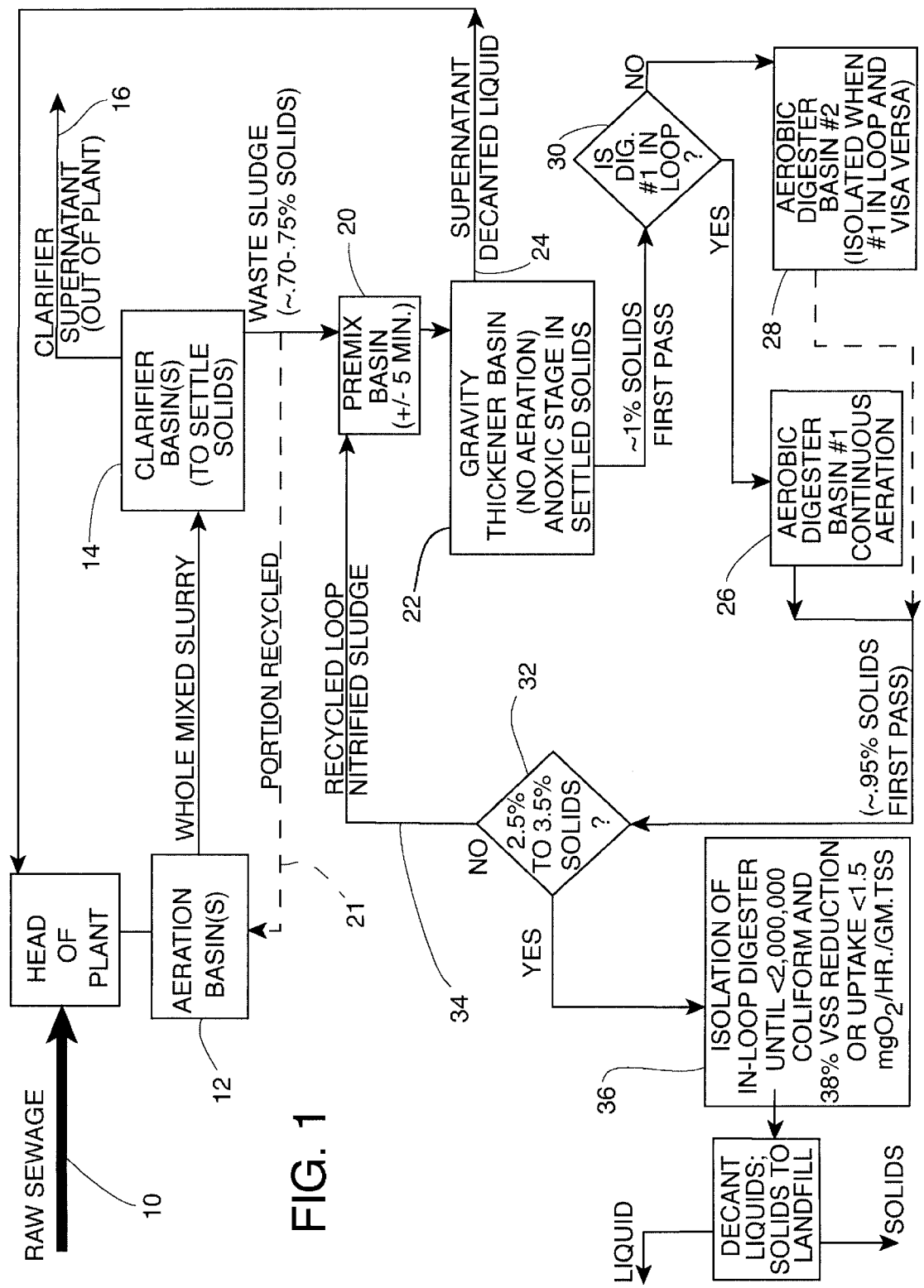
FIG. 1 is a flow chart outlining the process of the invention.

In the drawings, the flow chart of FIG. 1 generally outlines the process of the invention. The head of the plant is indicated as receiving raw sewage 10 entering the system. The raw sewage first enters one or more aeration basins 12. As in many typical aerobic digestion treatment plants, the aeration basin 12 aerates the incoming sludge, reducing BOD, and some of the volatile solids reduction occurs there. After a prescribed detention time in the aeration basin, the whole mixed sludge flows to one or more clarifier basins 14 as indicated in the drawing, where solids settle to the bottom of the basin. Overflow liquid from the clarifier leaves the plant and is further treated, as shown at 16 in the drawing.

As noted above, some treatment plants have a main activated sludge process, generally replacing aeration basins and clarifiers, and from which sludge is wasted to digesters. Such wasted sludge is treated in the same manner in the process of the invention.

If clarifiers are included, settled solids from the bottom of the clarifier basin(s) form a sludge which, in the process of this invention, is delivered preferably to a premix basin 20. Typically this sludge from the clarifier basins has a solids content of about 0.70 to 0.75%. A portion of the sludge may be recycled to the aeration basin, as shown at 21, to maintain a desired solids concentration in the aeration basin(s). This is a known practice.

As outlined above, in the premix basin 20 the sludge is subjected to vigorous aeration in order to reduce odors, to ensure complete mixing with recycled sludge, and to activate microbes. Detention time in the premix basin is at least about 5 minutes.

Then the aerated sludge, together with recycled nitrified sludge from the in-loop digester (as explained below), with highly activated microbes, is delivered into a gravity thickener basin 22 as shown in the flow chart.

As explained above, it is important that this thickener 22 be a gravity thickener, rather than a centrifuge, belt or drum thickener, because more than just thickening occurs in this basin. Solids settle to the bottom of the thickener basin into a thickened mass, in the absence of any aeration. Within this quiescent zone, an anoxic stage is established. Without oxygen, the activated microbes, starving for oxygen, break down the nitrates in solution and cause denitrification of the sludge. Acidity represented by $HNO_3$ produced during nitrification is removed as a result of this reaction, as explained above. Alkalinity is recaptured by reducing nitrate-nitrogen and restoring ammonia-nitrogen to the liquid in the sludge.

Typically, approximately one hour in this anoxic stage in the gravity thickener basin is sufficient to recover lost alkalinity in the sludge, but this parameter is adjusted as needed for system performance. It is important that this detention time be controlled, since excessive time in anoxic stage can cause anaerobic conditions to occur. Monitoring can be used as discussed above. Control of the time period in the anoxic zone can be by timers on airlift pumps; however, any appropriate form of flow measurement and control can be used. Temperature of the system, including the anoxic stage, should also be controlled, between about 20° C. and 35° C.

The gravity thickener 22 produces a supernatant liquid indicated at 24, residing above the anoxic-stage settled solids which are at the bottom of the basin 22. The supernatant is decanted as indicated at 24 and is recycled to another part of the plant, preferably back to join the raw sewage at the head of the plant, for introduction into the aeration basins 12.

From the bottom of the gravity thickener basin, the sludge exiting the basin has an increased density, e.g. about 1% solids after a first pass through the basin. Its pH tends to be about 7. This thickened, denitrified sludge in a preferred embodiment of the process is delivered to one of two digesters 26 and 28. As noted in the decision box 30 on the flow chart, either digester No. 1 or digester No. 2 is in loop, and the thickened sludge is delivered to the digester which is currently in loop, in accord with an important aspect of the invention. FIG. 1 shows the situation where digester basin No. 1 is currently in loop, and the sludge is delivered there. Typically, aerobic digester basin No. 2 (at 28) would be isolated when digester No. 1 is in loop, in accord with an important aspect of the invention.

As noted in the flow chart, in the digester 26, i.e. aerobic digester basin No. 1, continuous aeration is applied to the sludge throughout the basin. Vigorous microbial action occurs, causing the breakdown of volatile solids which is the goal of aerobic digestion.

Basically, this phase of aerobic digestion is continued on a loop basis involving recycle through the premix basin 20 and the gravity thickener basin 22, until a design goal of 2½% to 3⅓% solids is achieved, as indicated in the decision box 32. Until this is achieved, a portion of the thoroughly mixed, partially digested sludge in the digester basin is delivered back to the premix basin 20, as indicated at 34. This partial recycling of sludge is advantageously accomplished in one preferred embodiment by a weir (at 50 in FIG. 2) in the digester over which sludge is displaced when new sludge is delivered into the digester 26, this displacement being caused by flow from the premix basin 20 and the gravity thickener 22 as discussed above. The recycled sludge is again mixed in the premix basin with new sludge which has been transferred from the main activated sludge process or clarifier basins upstream, and the mix preferably is vigorously aerated. The aerated sludge, the recycled portion of which is nitrified, is delivered to the gravity thickener basin 22 where the solids again settle and enter an anoxic stage. Supernatant is decanted at 24, and the settled solids form a sludge at the bottom of the basin 22 which regains lost alkalinity, releasing nitrogen. The pH-balanced sludge, further thickened by multiple passes through the loop, is returned to the in-loop digester 26. Reduction of total nitrogen in the sludge via the anoxic stage is an important aspect of the invention, since lower nitrogen in the final sludge enables increased use of the sludge on land.

The process loop is continued until, as discussed above, a solids content of 2½% to 3½% (depending on plant design) is achieved in the in-loop digester. As new and more-liquid sludge from the clarifier basins (or main activated sludge process) continues to enter the loop, supernatant liquid is drawn off from the thickener basin 22, the volume of this supernatant being essentially equal to the volume of the newly entered sludge, the result being that the sludge from the thickener basin becomes progressively higher in solids content.

When the design solids content at 32 is achieved in the in-loop digester 26, the flow chart indicates that the in-loop digester is then isolated (block 36). No more inflow of sludge nor outflow for recycling occurs with this digester, for the remainder of a total plant detention time of approximately 20 to 40 days, until targets for volatile solids reduction are met for Class B sludge. Under current regulations, the sludge is required to have less than 2,000,000 colony forming units of coliform per gram T.S.S. (total suspended solids), along with either a 38% reduction of volatiles or a standard oxygen uptake rate of less than 1.5 mg $O_2$/hr/gm T.S.S. The sludge in the isolated digester is aerated, but at a lower rate than typically applied in a digester due to the low V.S.S. (volatile suspended solids) remaining in the sludge. Little or no on/off cycling of air in the isolated digester is needed, because V.S.S. has already been greatly reduced.

As outlined above, more than two digesters can be utilized with one thickener if desired.

The last block 40 indicates that at the end of the digester isolation, when the pathogen reduction goals have been achieved, aeration is shut off, the solids are allowed to settle, liquid is decanted and solids are removed. The liquid normally is sent back to the head of the plant. The solids removed are qualified for landfill under Class B requirements. In some cases efficiency is improved by drawing off water during isolation (and recycling to the head of the plant). This is done by turning off aeration temporarily and allowing solids to settle, then drawing off supernatant.

Figure 2:
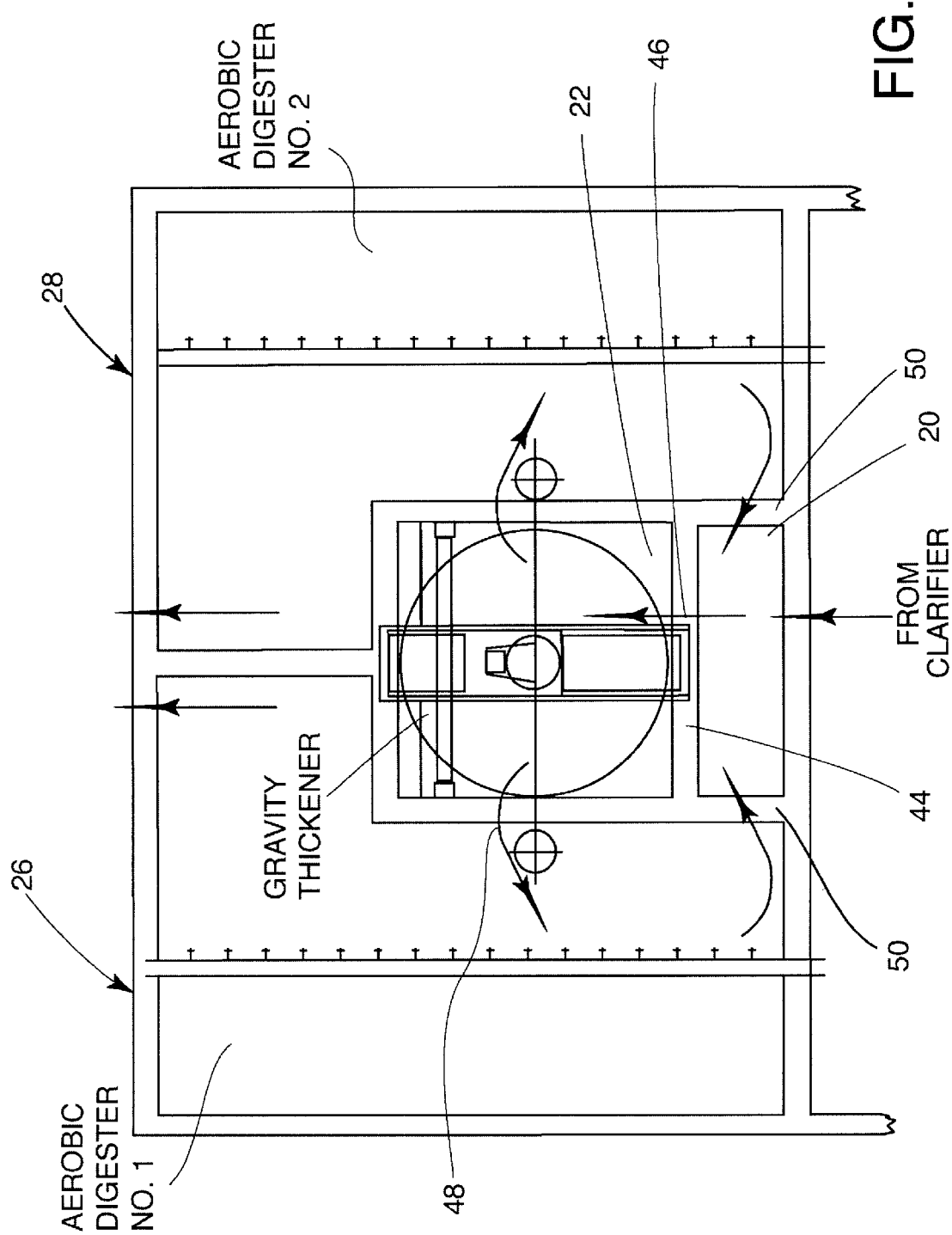
FIG. 2 is a schematic plan view showing a principal portion of the system which includes a premix basin, a thickener basin and two aerobic digesters.

FIG. 2 shows schematically, in plan view, an example layout of aerobic digesters 26 and 28 (digester No. 1 and digester No. 2), with the premix basin 20 and the gravity thickener 22, in one preferred embodiment. Except for the digester isolation stages mentioned above, the system can be operated essentially on a continuous (but interrupted) flow basis. Thus, sludge from the main activated sludge process or clarifier basins is admitted to the premix basin 20, and as this sludge is continuously fed into the premix basin, mixed slurry from this basin can be fed into the gravity thickener basin 22 via a weir, which may be located at 44 in FIG. 2, directly between the two basins. The flow between these two basins is indicated by the arrow 46 in FIG. 2.

Assuming digester No. 1 (at 26) is active, as discussed above, thickened sludge from the bottom of the gravity thickener is delivered into digester No. 1. This may be by pumping from the bottom of the thickener. An arrow 48 in FIG. 2 indicates this transfer.

Sludge flow from the in-loop digester (26 in FIG. 2) to the premix basin 20, in recycling of the sludge, preferably is effected by a weir at 50 in FIG. 2, between the digester and the premix basin 20. A similar weir is positioned between digester No. 2 (28) and the premix basin 20. Liquid level in both digesters preferably is maintained about 6 inches above that in the premix basin. In some systems the premix basin may not be adjacent to either the thickener basin or the digesters, in which case pumping may be required rather than weir overflow.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. In a sewage treatment process which includes a main activated sludge process and/or at least one clarifier basin and an aerobic digester basin, and in which sludge from the main activated sludge process or clarifier is prethickened in a thickener prior to delivery into the digester, a method for operating the process so as to reduce overall aeration requirements, substantially eliminate addition of alkaline agents, and reduce tankage requirements, comprising:

transferring waste sludge from the main activated sludge process or clarifier basin first to a premix basin, mixing the sludge in the premix basin, moving the mixed sludge to a gravity thickener basin, in the gravity thickener basin, allowing solids to settle to the bottom of the basin as a sludge, without aeration of the sludge in the thickener basin, thus establishing a quiescent state and an anoxic stage within the settled sludge, and maintaining the anoxic stage long enough to cause the sludge to be denitrified by microbial action, releasing nitrogen and raising and stabilizing the pH of the sludge, decanting supernatant liquid resulting from separation in the gravity thickener, out of the gravity thickener basin, moving the thickened sludge from the bottom of the thickener basin into the aerobic digester, aerating the sludge in the aerobic digester basin, cycling back a portion of the sludge in the aerobic digester basin to the premix basin to mix with waste sludge from the main activated sludge process or clarifier basin, maintaining the anoxic stage at such volume, as compared to the digester, and at such detention time and recycle rate as to maintain pH in the thickener and digester essentially within a range of 6.8 to 8.0, and repeating the above steps, thus continuing to recycle sludge in a premix/thickener/digester loop, until a preselected solids content level is achieved in the digester basin.

2. A process according to claim 1, wherein aeration air used throughout the process is no greater than about 5.75 moles oxygen per mole of sludge biomass.

3. A process according to claim 1, wherein the sludge wasted to the premix basin has a solids content of about 7000 to 8000 mg/L, and wherein the solids content of the sludge is increased to about 10,000 mg/L in the thickener basin in a first pass.

4. A process according to claim 1, wherein, through said cycling back of the digester sludge, the solids content in the digester is ultimately brought up to about 25,000 to 35,000 mg/L, as said preselected solids content level.

5. A process according to claim 4, wherein two said aerobic digester basins are provided, and the process further including, after the preselected solids content level is achieved in the first digester basin, isolating the first digester basin by removing the first digester from the loop including the premix basin and the thickener basin, placing the other digester in loop with the premix and thickener basins, and repeating the process.

6. A process according to claim 5, including aerating the sludge in the isolated digester.

7. A process according to claim 5, wherein the process is operated with less than about forty days' total detention time for the sludge.

8. A process according to claim 1, wherein the aeration of the sludge in the premix basin is sufficient to raise the dissolved oxygen level of the slurry up to about 2 mg/L.

9. A process according to claim 1, wherein the sludge is vigorously aerated in the premix basin, for a sufficient time to raise microbial activity of the sludge.

10. A process according to claim 9, wherein detention time in the premix basin is at least about 5 minutes.

11. A method of operating an aerobic digestion sludge treatment plant so as to reduce aeration requirements and to generally balance pH without the need to add alkaline agents, comprising:

(a) receiving incoming sewage at a head of the plant, (b) treating the sewage in a main activated sludge process or aerating the sewage and then clarifying the resulting sludge in at least one clarifier basin, (c) transferring waste activated sludge from the main activated sludge process or clarifier basin to a premix basin, (d) mixing and aerating the sludge in the premix basin, (e) transferring the sludge from the premix basin to a gravity thickener basin and settling solids to the bottom of the gravity thickener basin, without aeration, to establish an anoxic stage of thickened sludge at the bottom of the basin for a sufficient detention time to denitrify the thickened sludge and to raise pH of the thickened sludge, while decanting supernatant liquid from above the thickened sludge and removing the liquid from the thickener basin, (f) transferring the thickened, denitrified sludge to an aerobic digester basin, and aerating the sludge in the digester basin, (g) after a preselected detention time in the digester basin, sufficient for nitrification and for microbial action to partially break down volatile solids and reduce the total solids content of the sludge, recycling a portion of the sludge from the digester basin back to the premix basin and aerating the sludge in the premix basin along with additional waste activated sludge which has entered the premix basin, thereby maintaining nitrification of at least the recycled portion of the sludge in the premix basin, and (h) continuing to recycle a portion of the sludge in a premix/thickener/digester loop, in accordance with steps (d), (e), (f) and (g), while also continuing steps (a), (b) and (c), progressively thickening the sludge until the solids content of the sludge in the digester reaches a preselected level.

12. The method of claim 11, wherein the step of recycling a portion of the sludge from the digester basin back to the premix basin comprises displacing surface sludge from the digester over an overflow weir as new sludge is added to the digester basin from the thickener basin, and transferring the displaced sludge to the premix basin.

13. The method of claim 12, wherein the digester and premix basins are adjacent, and wherein the overflow weir is positioned directly between the digester basin and the premix basin, such that the displaced sludge falls over the weir and directly into the premix basin.

14. The method of claim 11, wherein the preselected level of solids content in step (h) is about 2½% to 3½% solids.

15. The method of claim 11, including the further steps of:

(i) when the solids content of the sludge in the digester reaches said preselected level, isolating the digester basin so as not to receive any further sludge, (j) aerating the sludge in the isolated digester, (k) maintaining the solids in the isolated digester until microbial action brings the pathogen level of the sludge down to below a predetermined target level, (l) allowing solids in the isolated digester to settle, and decanting liquid from the isolated digester, and (m) transferring the settled solids for further solids concentration or for use in landfill.

16. The method of claim 15, including providing two digester basins, and maintaining one of the digester basins in the premix/thickener/digester loop while the other digester basin is isolated, and reversing functions of the two digesters after the settled solids have been transferred from an isolated digester.

17. The method of claim 15, wherein the predetermined pathogen target level is about 2,000,000 colony forming units per gram of solids.

18. The method of claim 15, further including shutting off aeration in the isolated digester at intermittent periods when the isolated sludge reaches a predetermined level of acidity.

19. The method of claim 15, wherein steps (a) through (m) are operated with less than about 40 days' total detention time.

20. The method of claim 11, further including operating steps (d) through (h) such that the pH of the sludge is maintained at about 6.8 to 8.0.

21. The method of claim 11, wherein the step of decanting supernatant liquid and removing the liquid from the thickener basin includes transferring such liquid to the head of the plant.

22. The method of claim 11, wherein aeration air used throughout the method is no greater than about 5.75 moles of oxygen per mole of sludge.

23. The method of claim 11, including maintaining the temperature of the sludge throughout steps (a) through (h) at about 20° to 35° C.

* * * * *